Dec. 23, 1930. R. J. NORTON 1,785,969
BRAKE SHOE STRUCTURE
Filed Dec. 7, 1928

Inventor
RAYMOND J. NORTON
By M. W. McConkey
Attorney

Patented Dec. 23, 1930

1,785,969

UNITED STATES PATENT OFFICE

RAYMOND J. NORTON, OF WASHINGTON, DISTRICT OF COLUMBIA, ASSIGNOR TO BENDIX BRAKE COMPANY, OF SOUTH BEND, INDIANA, A CORPORATION OF ILLINOIS

BRAKE-SHOE STRUCTURE

Application filed December 7, 1928. Serial No. 324,361.

This invention relates to improvements in brake shoe structures.

The usual type of internal expanding brake comprises two or more shoes pivoted to the backing plate, which at their free ends are expanded or forced outwardly into engagement with the drum by means of a cam or equivalent element. Since the cam is a rotating member, the applying surface of which is generated upon small radii, there is necessarily a relative movement between the face of the cam and the adjacent surfaces on the thrust end of the shoes. Due to constant application of the brakes, this movement tends to abrade or wear down the contacting surfaces of the shoe.

The purpose of the present invention is to provide a cam thrust member, adapted to be attached to the shoes, which will present a hard surface and one which possesses a very low coefficient of friction. Since there is relative movement between the cam and the wear plate the efficiency of operation depends in a large degree upon the frictional resistance between these two members, and according to the present invention this friction is greatly minimized, while at the same time presenting a very durable wearing surface.

In order to make the invention more readily understood, I have shown in the accompanying drawing a preferred embodiment of it.

Figure 1:
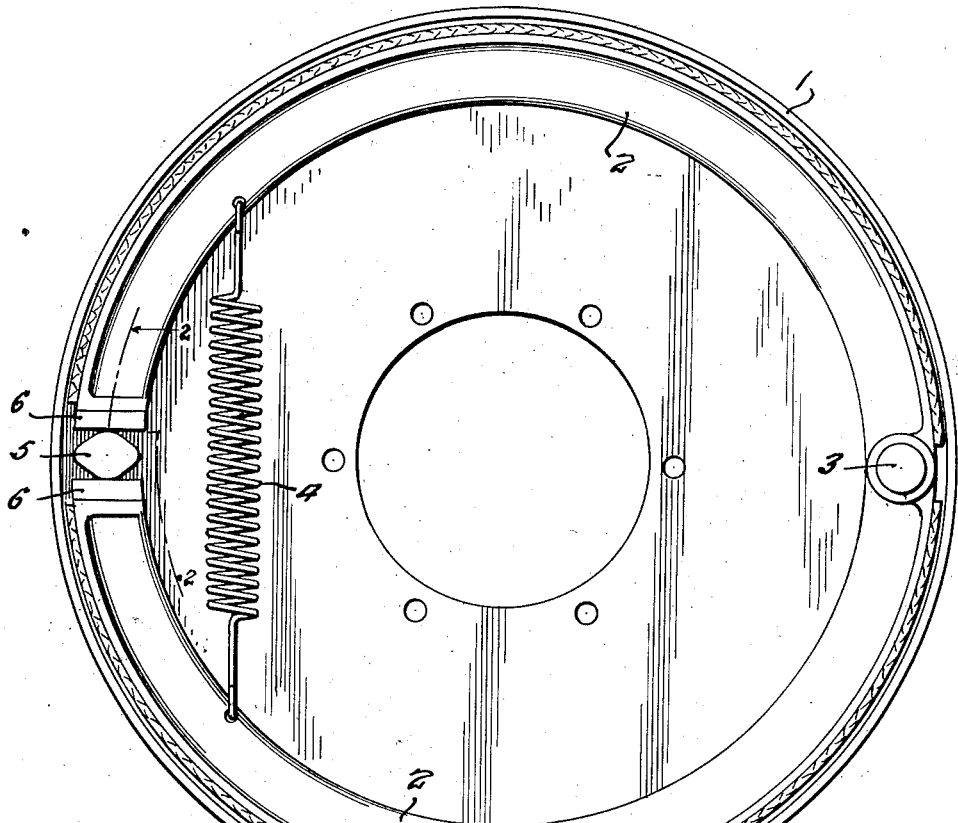
Figure 1 is a cross sectional elevation of a typical brake apparatus having cam expanded shoes.
Figure 2:
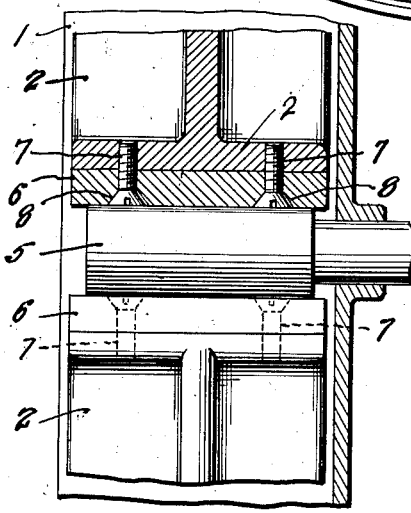
Figure 2 is an enlarged detail of the cam thrust member and the associated section of the shoe.

The invention comprehends the idea of impregnating suitable fibrous material such as paper, cloth and the like with the components of a synthetic resin and with a suitable lubricant. Upon reaction of the components of the resin an infusible hard substance is produced which comprises synthetic resin with which is incorporated a predetermined amount of a lubricant. This operation may be carried out with relatively thin sheets of material and the final cam plate built up of a number of these so as to form a laminated structure.

Because of its high reactivity, its ease of molding in a metal matrix and the desirable appearance of the resulting product it is preferred to use as the synthetic resin one which comprises a condensation product of furfural and phenol or their equivalents. In carrying out the invention, a strip of paper or other suitable fiber may be treated with a lubricant such as paraffin, lanum, linseed oil neat's-foot oil, etc. The lubricant may first be dissolved in a suitable solvent such as benzol and the solution used to impregnate the fibrous core. Thereafter the core may be impregnated with a solution of an infusible resin in a suitable vehicle, in which is also incorporated a hardener and subjected to such heat and pressure conditions as will cause complete reaction and the formation of the infusible product.

The infusible resin may be made up by reacting suitable predetermined amounts of furfural and phenol in the presence of a suitable catalyst such as hydrochloric acid. The phenol crystals may first be fused and then the furfural and acid catalyst added. It is to be noted that the amount of furfural or equivalent agent, which is employed should be insufficient to form an infusible resin. The substances are allowed to react and then are heated to a suitable temperature to eliminate excess water and acid; thereafter the mass may be steam distilled to remove the excess of phenol in the well-known manner. Residual traces of the acid may be neutralized by a suitable alkali.

This product which is a fusible gum or resin is then dissolved in a suitable solvent such as alcohol, acetone, etc. There is then added such quantity of a hardening agent as, upon reaction, will insure an infusible condensation product. For the hardening agent may be used furfural and ammonia or furfuramid. In lieu of the furfural or its derivative other hardeners such as hexamethylenetetramin, paraform, etc., may be used.

This potentially reactive composition is then used as an impregnant for the pretreated paper or fiber. After impregnation of the fiber by the fusible resin, the material may then be placed in a mold and heated to accelerate the final reaction and insure the formation of the hard, set, infusible resin. The amount of hardening agent employed, and the temperature of the treat will vary upon the degree of hardness and infusibility which is desired.

After such treatment the resulting product comprises, so to speak, a permanently lubricated resin. As indicated, this may be made up in the form of relatively thin strips which may be easily cut and punched out with a die. A number of these may be built up as a stack, cemented together by means of the phenolic condensation product so as to form a plate of the desired thickness. Likewise these may be built up as a stack and permanently held together by means of a metallic clamp crimped over the edges. However, if desired the plate may be made up initially of the desired thickness by impregnating the fiber with the synthetic gum in liquid or plastic form and several layers of these superimposed. The final treatment to effect infusibility may then be carried on the composite structure.

While specific examples of the components of a synthetic resin have been given it will be understood that other specific and equivalent materials may be used. Thus instead of using phenol, one may employ equivalent substances such as cresol, resorcinol, naphthol, etc. In lieu of furfural other substances which will react with the phenolic constituents to form a condensation product may be utilized; thus one may use furfuramid, formaldehyde, acetaldehyde, paraldehyde, etc.

Similarly the impregnation of the fiber by the lubricant and the potential reactive resin may be carried out simultaneously. The lubricant may be dissolved in a benzol solution and added to the solution of the resin and the resulting mass used as the impregnant for the fiber.

It will be understood that there may be a wide variety of specific mountings for the finished cam plate. In the accompanying drawings, two of these are shown to typify the manner in which the cam plate may be associated with the shoe.

In the drawings a typical brake structure is represented. This comprises a brake drum 1 within which are mounted the shoes 2. These may be anchored by means of the member 3 which is suitably secured to the usual backing plate. The shoes are held in inoperative or retracted position by means of the return spring 4 and are spread apart into frictional engagement with the drum by suitable spreading means such as the cam 5.

The cam directly abuts the wear plates 6. These may be secured to the shoe by means of countersunk screws or bolts 7, the head portions of which seat in the apertures 8. It is understood that the member 7 which is shown exemplifies any suitable type of securing means.

As indicated hereinbefore the wear plate 6 may be made up of laminæ or a single block of the lubricated synthetic resin. In the face of these members a countersink may be bored and the portion below the countersink may be tapped to permit the admission of the securing member.

Figure 3:
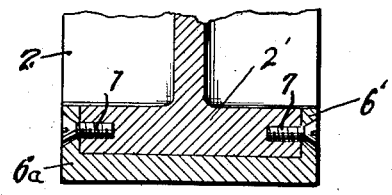
Figure 3 is an enlarged detail of a modified form of cam plate.

If desired the wear plate may be initially made up in the form shown in Figure 3. This comprises the face portion 6ª and the lateral extensions 6'. The extensions may be tapped to permit the reception of suitable locking members designated by the numeral 7. It will be understood that the brake shoe 2, adjacent the cam plate, may be designed to conform to any desired shape of the cam plate.

A relatively large number of specific mountings naturally suggest themselves to those skilled in the art. Those which have been shown are given merely as examples to indicate the general method of mounting the improved plate.

I claim:

1. A brake shoe including a circumferential flange, and a wear member associated with one end of the flange which comprises a phenolic condensation product in which a lubricant is permanently embodied.

2. A brake shoe comprising a circumferential flange and a wear plate associated with one end of the flange which comprises a lubricated resin.

3. A brake shoe comprising a circumferential braking flange and an inherently lubricated cam plate associated therewith.

4. A brake shoe including a circumferential braking flange having a thrust taking section which comprises a permanently lubricated non-metallic member.

5. A brake shoe including a circumferential braking flange, a wear plate associated with the flange comprising laminæ of a lubricated infusible synthetic resin.

6. A brake shoe including a circumferential metallic braking flange and a cam thrust section comprising a lubricated furfural condensation product.

7. A cam wear plate for brake shoes comprising laminations of fibrous material in which a lubricant is incorporated bonded with a synthetic resin.

8. A cam wear plate for brake shoes comprising a stack of permanently lubricated synthetic resin strips.

9. A cam wear plate for brake shoes comprising a furfural condensation product having a lubricant incorporated therein.

10. A cam wear plate for brake shoes comprising an infusible synthetic resin having a lubricant incorporated therein.

In testimony whereof I affix my signature.

RAYMOND J. NORTON.